R. KAESER.
TAILOR'S MEASURING DEVICE.
APPLICATION FILED MAY 19, 1916.
1,218,565.
Patented Mar. 6, 1917.
2 SHEETS—SHEET 2.
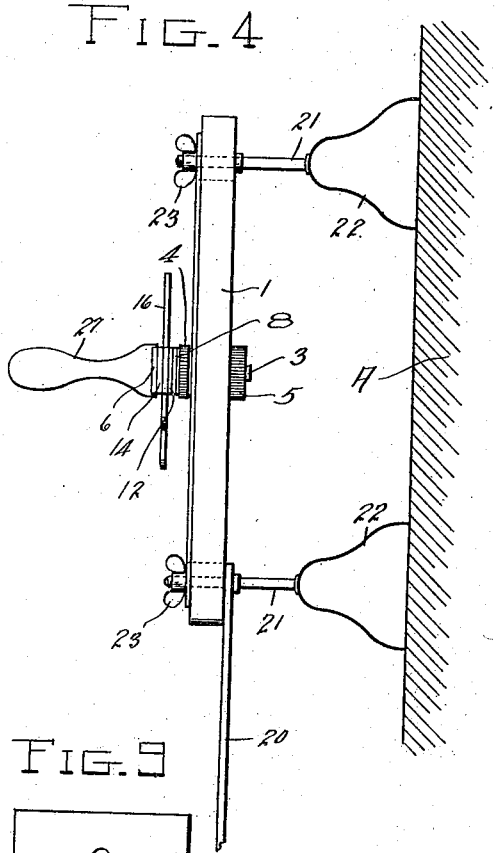
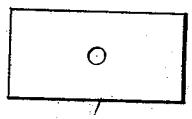
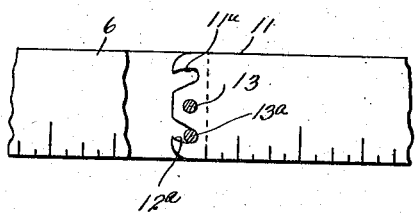
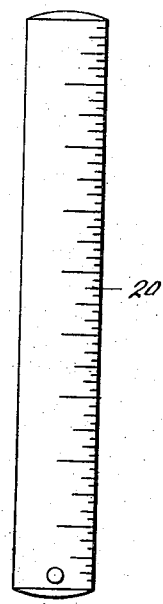
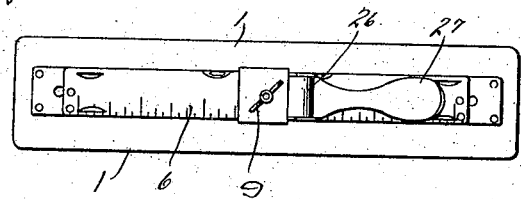
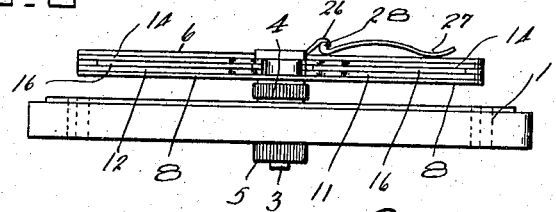
Witnesses
Chas. H. Trotter.
H. H. Byrne
Inventor
Robert Kaeser,
By Bedford & Doolittle
Attorneys

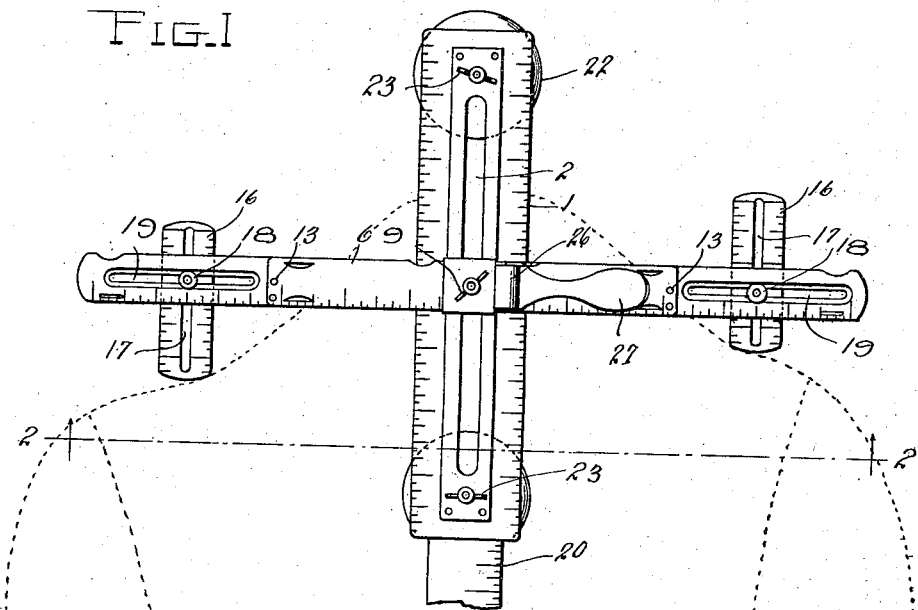
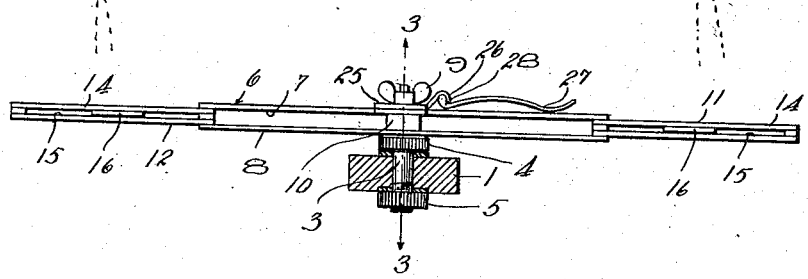
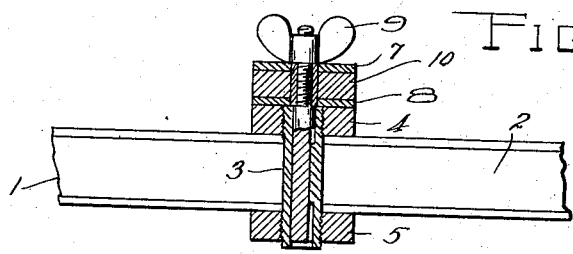

UNITED STATES PATENT OFFICE.

ROBERT KAESER, OF MILWAUKEE, WISCONSIN.

TAILOR'S MEASURING DEVICE.

1,218,565. Specification of Letters Patent. Patented Mar. 6, 1917.

Application filed May 19, 1916. Serial No. 98,628.

*To all whom it may concern:*

Be it known that I, ROBERT KAESER, a citizen of the United States, residing at Milwaukee, Milwaukee county, and State of Wisconsin, have invented and discovered certain new and useful Improvements in Tailors' Measuring Devices, of which the following is a specification.

The present invention relates to measuring devices and consists in the combinations and arrangements of parts hereinafter described and particularly set forth in the accompanying claims.

The invention has for its purpose to provide a measuring device for tailors' use, whereby the physical defects of a customer, being measured for a suit of clothes, may be accurately determined and the suit accordingly cut and built to hide the fault when the same is worn by the person.

A further purpose of the invention is to produce a measuring device which may be used for various other measurements necessary for making clothes to order, and which is constructed to be folded into a small article convenient for carrying on the person or placing in a traveling receptacle.

The measuring device is shown by way of illustration in the accompanying drawings, wherein:

Figure 1 is a front elevational view of the device and showing the same in use,

Fig. 2 a transverse sectional view thereof, taken on the line 2—2 in Fig. 1,

Fig. 3 a transverse sectional view, taken on the line 3—3 in Fig. 2,

Fig. 4 a side elevational view of the device showing the means for mounting the same on a wall, Fig. 5 a detail view of one of the pivotal connections between the parts, Fig. 6 a detail view of the folded part of the vertical scale, Fig. 7 a top plan view of the device folded, Fig. 8 a side elevational view of the same, and Fig. 9 a view of a block to be used in lieu of the vacuum cup type of support.

It has been found, in many cases, that people have one shoulder lower than the other, and unless this fault is discovered by the tailor when taking measurements for a suit of clothes, the clothes made are unsatisfactory, to this extent at least; and to overcome this objection, it is proposed to employ a measuring device of the construction shown herein, in which 1 designates a body portion, or section, provided with suitable graduating marks on the marginal edges thereof, and which is preferably about fifteen inches in length, to the end that the device as a whole may be conveniently carried on the person or stored in a portable receptacle. The member 1 has formed therein a slot 2 to receive a slidable bolt or pin 3 that has a pair of knurled nuts 4 and 5 adapted for securing the same in adjusted position. A member 6, formed of two separated parts 7 and 8, is pivotally mounted on the bolt 3 and adapted to be adjustably secured thereon by the wing nut 9 threaded on said bolt. A spacing block 10 is fitted on the bolt 3, between the parts 7 and 8, to afford the nut 9 the required base for its clamping action.

A pair of side members 11 and 12 is pivotally mounted on the member 6 by the pivot pins 13 secured at the ends thereof (see Fig. 5), and said side members are adapted to be folded between the parts 7 and 8 of the member 6, when the device is not in use, after the manner illustrated in Figs. 7 and 8. The side members 11 and 12 are graduated continuously with the graduations on the member 6, and are constructed each of two parts 14 and 15 to receive the two end members 16 that are disposed vertically, whereby to measure the extent of shoulder defect of the person being fitted, as indicated in Fig. 1. The end members 16 are slotted, as at 17, to receive pins 18 that are laterally adjustable within the slots 19 formed in the side members 11 and 12. The two end members 16 are adapted to fit wholly within the spaces between the parts 14 and 15 of the side members 11 and 12 when the article is collapsed, and by the arrangement of the slots 17 and 19, for the pins 18, the two end members 16 may be independently adjustable laterally for measuring the width of the shoulders and, at the same time, the difference between the high and low shoulders, if such be the case.

In the use of the device, the folded rule 20 (see Fig. 6), which is in three joints and five feet in length, is connected with the member 1, thus making the device six feet and three inches in length, or of a height sufficient for measuring the average person. The article is supported against the face of a wall A by the pair of rods 21, having vacuum cups 22 that adhere to said wall by suction, after the well-known manner; and wing nuts 23 on said rods secure the members 1 and the depending strip 20 at a distance of approximately three inches from the wall. In lieu of the vacuum cup support 20, the rods 21 may be mounted on blocks, such as the block 24 (see Fig. 9), or any other appropriate form of supporting device may be employed.

The side members 11 are each provided with two notches 11ª and 12ª, on either side of the pivot pin 13, adapted respectively to engage with the stop pin 13ª and hold the members 11 in rigid alinement with the member 6 when said members 11 are extended, and to hold said members 11 locked when folded between the parts 7 and 8 of the member 6, i. e. the stop 13ª engaging with the slot 11ª keeps the member 11 from turning in one direction when folded and, engaging with the other slot 12ª, keeps the member 11 from turning in the opposite direction when it is extended.

A clamp is provided for securing the several members of the device against relative displacement when the article is folded; and said clamp consists of a plate 25 mounted on the member 7 and having a curled end portion 26 that forms a hinge bearing for the lever 27 that is constructed with a cam 28 adapted to engage with the upper part 7 of the member 6 and exert a clamping action thereon to hold the several parts in frictional engagement when the lever is pressed down, as in Figs. 7 and 8, and to relieve the pressure and permit the parts to be distended to the positions shown in Fig. 1 when the same is to be used.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent, is:

1. A measuring device comprising a supporting member, a laterally disposed member having graduations thereon vertically adjustable on said supporting member, and pieces having graduations thereon mounted to have lateral and vertical adjustment on said laterally disposed member, and foldable parallel therewith, substantially as set forth.

2. A measuring device comprising a supporting member, a laterally disposed member having graduations thereon vertically adjustable on said supporting member, the respective end portions of said laterally disposed member provided with horizontal slots, studs slidably mounted in said slots, and slotted pieces having graduations thereon vertically adjustable on said studs, said slotted pieces being foldable parallel with the laterally disposed member, substantially as set forth.

3. A measuring device comprising a supporting member, a laterally disposed member formed of spaced parts adjustably mounted on said member, side members hingedly mounted on said lateral member and foldable between the parts thereof, and end pieces having graduations thereon mounted to have vertical and lateral adjustment on said side members, substantially as set forth.

4. A measuring device comprising a supporting member, a laterally disposed member formed of spaced parts vertically adjustable on said member, side members formed of spaced parts pivotally mounted on said lateral member and foldable between the parts thereof, and end pieces mounted to have vertical and lateral adjustment on said side members and foldable between the parts thereof, substantially as set forth.

5. A foldable measuring device comprising a slotted member having graduations thereon, a bolt adjustably mounted in said slotted member, a member comprising spaced parts pivotally mounted on said bolt, side members comprising spaced parts pivotally mounted on the respective ends of said pivoted member and foldable between the parts thereof, and end pieces adjustably mounted on said side member and foldable between the parts thereof, substantially as set forth.

6. A foldable measuring device comprising a slotted member having graduations thereon, a bolt adjustably mounted in said slotted member, a member comprising spaced parts pivotally mounted on said bolt, side members comprising spaced parts pivotally mounted on the respective ends of said pivoted member and foldable between the parts thereof, and a clamping device mounted on said bolt and the member pivoted thereon adapted to securely hold the folded parts of the device against displacement, substantially as set forth.

7. A foldable measuring device comprising a member constructed of spaced parts, a pin secured to said parts at one end thereof, a member pivotally mounted on said pin and foldable between the parts of said first member, the pivoted end of said pivoted member constructed with notches, and a stud mounted on the first named member adapted to engage with one of said notches when extended and hold the pivoted member against turning in one direction, and against the other notch when folded to hold the pivoted member against turning in the opposite direction, substantially as set forth.

In witness whereof, I have hereunto set my hand and seal at Milwaukee, Wisconsin, this 16 day of May, A. D. nineteen hundred and sixteen.

ROBERT KAESER. [L. s.]

Copies of this patent may be obtained for five cents each, by addressing the "Commissioner of Patents, Washington, D. C."